J. E. EMERY & D. E. HUNTER.
MACHINE FOR SLITTING THE SHELLS OF NUTS.
APPLICATION FILED AUG. 10, 1905.

1,019,031.

Patented Mar. 5, 1912.
9 SHEETS—SHEET 1.

Fig. 1.

J. E. EMERY & D. E. HUNTER.
MACHINE FOR SLITTING THE SHELLS OF NUTS.
APPLICATION FILED AUG. 10, 1905.

1,019,031.

Patented Mar. 5, 1912.

J. E. EMERY & D. E. HUNTER.
MACHINE FOR SLITTING THE SHELLS OF NUTS.
APPLICATION FILED AUG. 10, 1905.

1,019,031.

Patented Mar. 5, 1912.

J. E. EMERY & D. E. HUNTER.
MACHINE FOR SLITTING THE SHELLS OF NUTS.
APPLICATION FILED AUG. 10, 1905.

1,019,031.

Patented Mar. 5, 1912.

WITNESSES:

INVENTORS:

UNITED STATES PATENT OFFICE.

JOHN E. EMERY, OF WINCHESTER, AND DAVID E. HUNTER, OF CAMBRIDGE, MASSACHUSETTS, ASSIGNORS, BY MESNE ASSIGNMENTS, TO JOHN S. EMERY & COMPANY, INC., OF BOSTON, MASSACHUSETTS, A CORPORATION OF MASSACHUSETTS.

MACHINE FOR SLITTING THE SHELLS OF NUTS.

1,019,031. Specification of Letters Patent. Patented Mar. 5, 1912.

Application filed August 10, 1905. Serial No. 273,592.

*To all whom it may concern:*

Be it known that we, JOHN E. EMERY and DAVID E. HUNTER, citizens of the United States, and residents of Winchester and Cambridge, respectively, in the county of Middlesex, State of Massachusetts, have invented certain new and useful Improvements in Machines for Slitting the Shells of Nuts, of which the following is a specification.

Our invention relates to apparatus for slitting the shells of nuts in such manner as to facilitate the removal of the shell and the extraction of the meat without injury to the latter, and is intended to provide an apparatus of this character which will operate rapidly and effectively, and by means of which the shell of a nut may be provided with any desired number of longitudinal slits each extending practically from one extremity of the nut to the other and having a depth equal to the thickness of the shell. Such treatment results in enabling separate fragments of the shell to be readily broken away and detached from the meat, leaving the latter whole and uninjured, and is particularly useful in the case of pecan nuts, which are very difficult to crack in the ordinary way without breaking the meat, on account of the toughness of the shell and the brittleness and compactness of the meat within the shell.

According to our invention, each nut is subjected to a number of successive slitting operations, the advantage gained by this mode of operation being that a much larger number of slits may be cut in each nut than is possible when all the slits are cut simultaneously, as heretofore, and we have found that if a considerable number of closely adjacent slits are provided the facility with which the fragments of shell may be broken away is greatly increased and there is much less liability of damaging the meat.

In the apparatus herein illustrated and described the slitting of the nuts is accomplished by causing each nut to travel past a series of rotating circular saws, each saw operating to cut a single slit as the nut moves past it and as many saws being employed as there are slits to be cut in each nut. These saws are preferably located in the same plane and form a circular series, and each nut is carried around the circle and then discharged, being also given a partial rotation on its axis between the cutting of successive slits. In order to increase the capacity of the machine, we prefer also to provide as many nut carriers as there are saws, so that all the saws may be made to operate simultaneously on different nuts as well as successively on the same nut.

Our invention also includes a feeding device whereby the nuts are automatically delivered in succession to the carriers, and also other features and details of construction and arrangement which will hereinafter be set forth at length, but it is to be understood that the specific features and details of construction herein described may be modified in various ways without departing from our invention as defined in the appended claims.

The preferred construction of our apparatus is illustrated in the accompanying drawings, in which—

Figure 2:
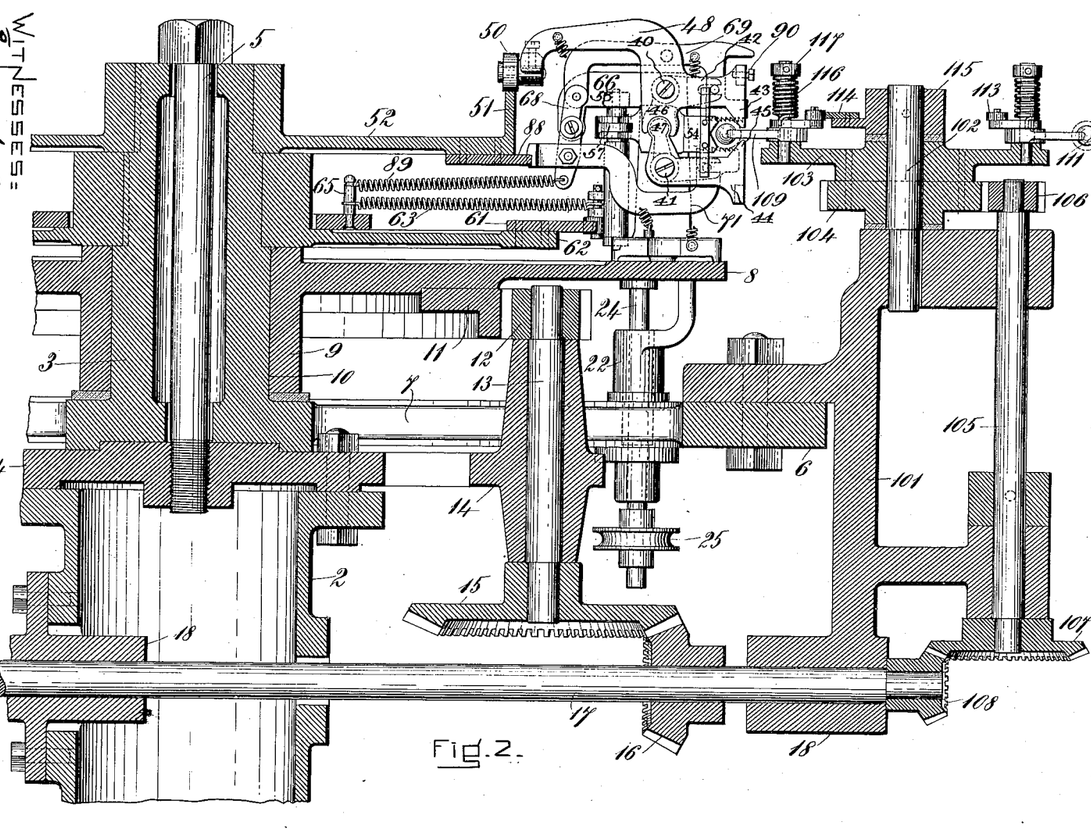
Fig. 2 is a central vertical section extending from the center of the machine to and through the nut-feeding device hereinafter described.

The working parts of our apparatus are preferably supported by a stationary central standard or base piece 2 carrying at its upper end a head 3 rigidly secured thereto. As represented in Fig. 2, a plate 4 is bolted to the top of the base piece 2 and the head 3 is secured to the top of the plate 4 by a bolt 5. This head 3 carries a ring 6 of which it forms the center and to which it is connected by spokes 7, the parts 3, 6 and 7 forming preferably a single casting. Above the ring 6 is located a table 8 provided at its center with a sleeve 9 mounted to rotate on a bearing 10 formed on the head 3, and means are provided for rotating said table continuously, said means being herein represented as consisting of an externally-toothed ring 11 bolted to the under side of the table and meshing with a pinion 12 secured to the upper end of a counter shaft 13, which is journaled in a bracket 14 carried by the plate 4 and provided at its lower end with a driving gear 15. This gear meshes with a gear 16 carried by a driving shaft 17 which is journaled in suitable bearings 18 and driven by a counter shaft 19 carrying fast and loose pulleys 20 and 21.

Figure 1:
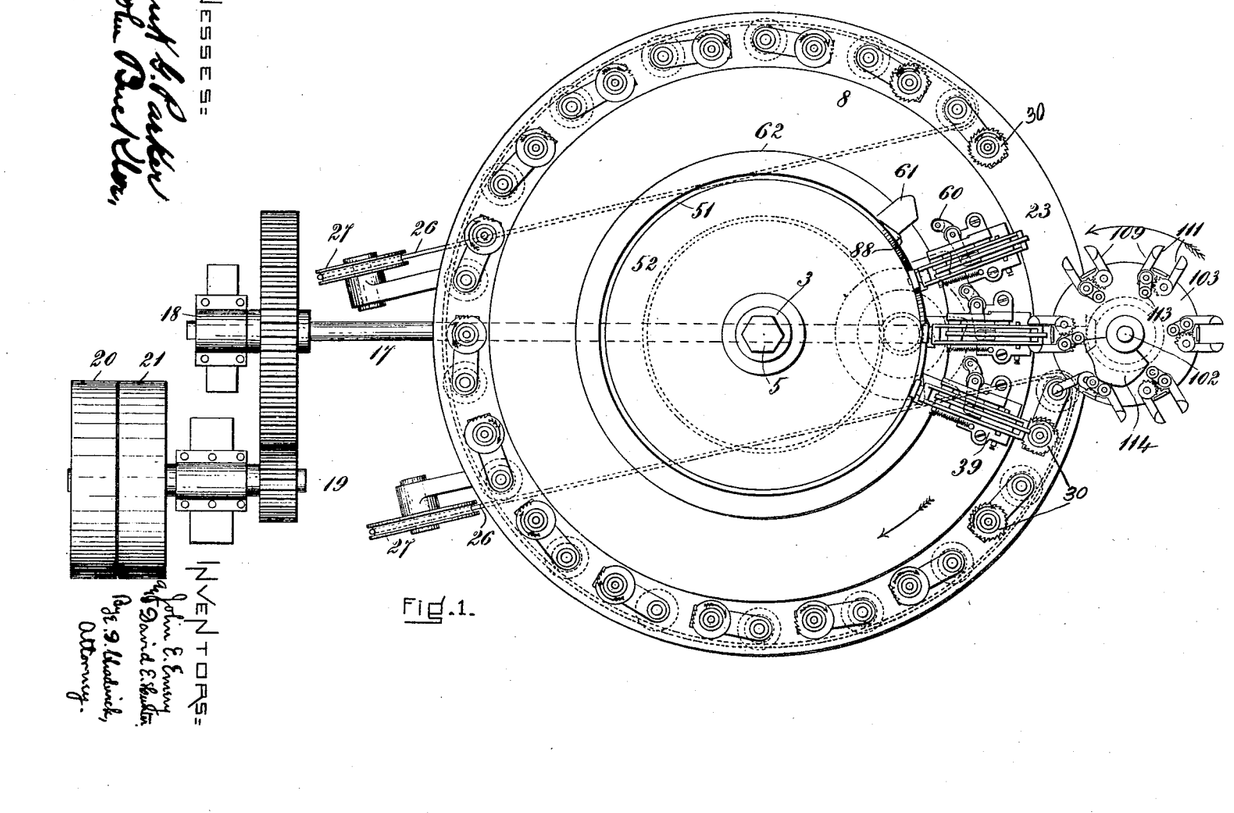
Figure 1 is a plan view of the complete apparatus, except that only three of the nut carriers are shown. These nut carriers being duplicates of one another, the rest of them are omitted for the sake of clearness.
Figure 3:
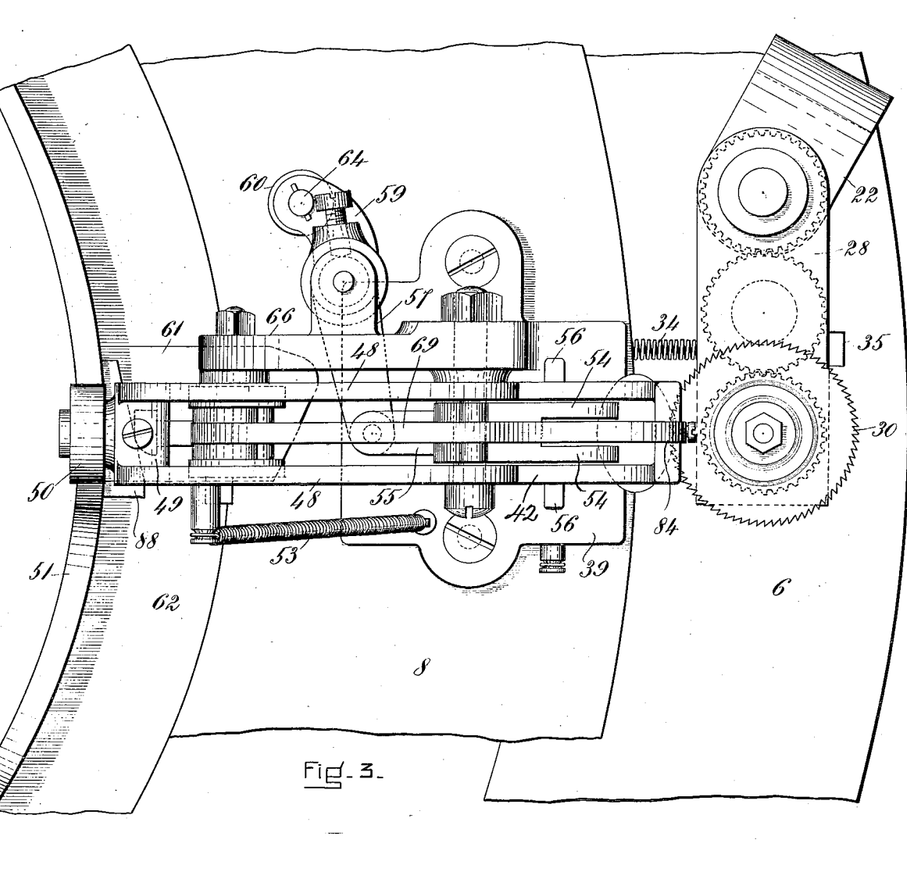
Fig. 3 is a plan view showing one of the nut carriers and also one of the slitting saws in operative relation to a nut.
Figure 5:
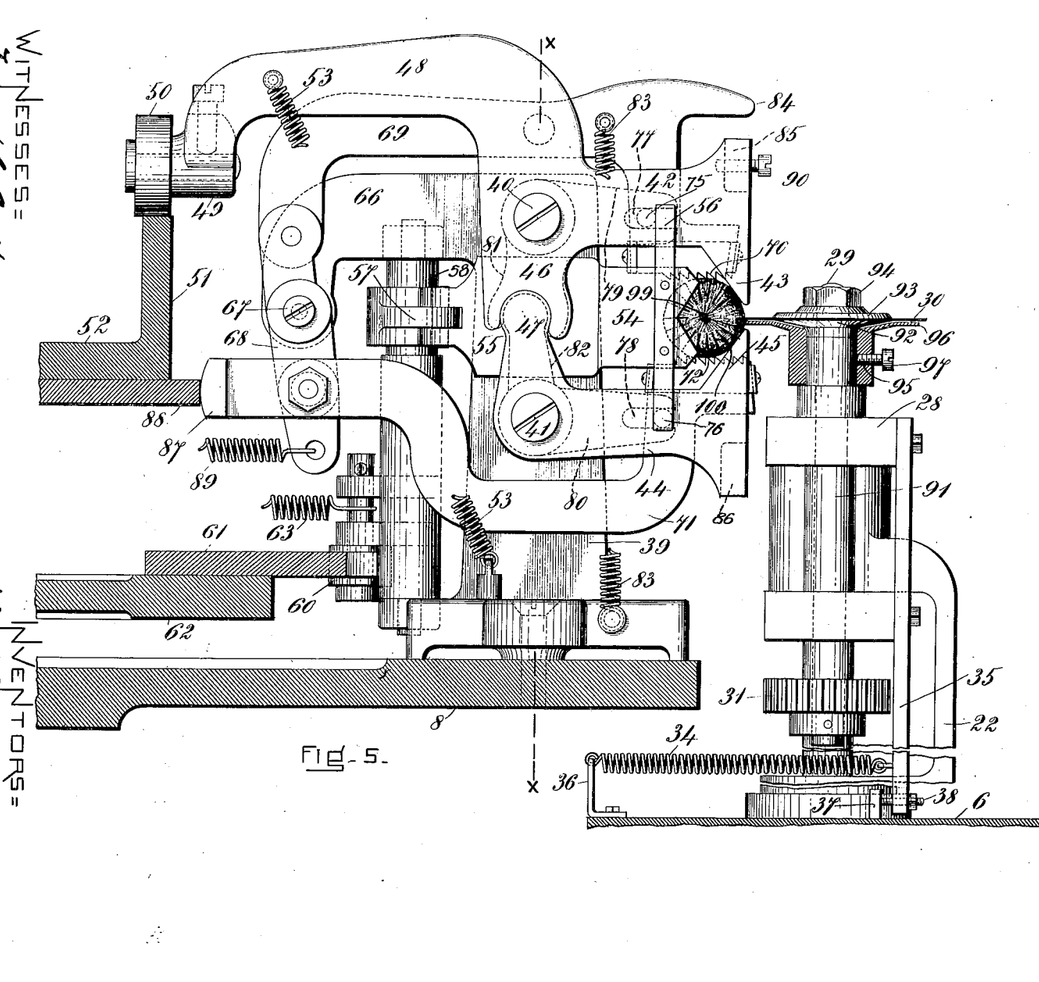
Fig. 5 is a side elevation of a nut carrier and adjacent saw.
Figure 7:
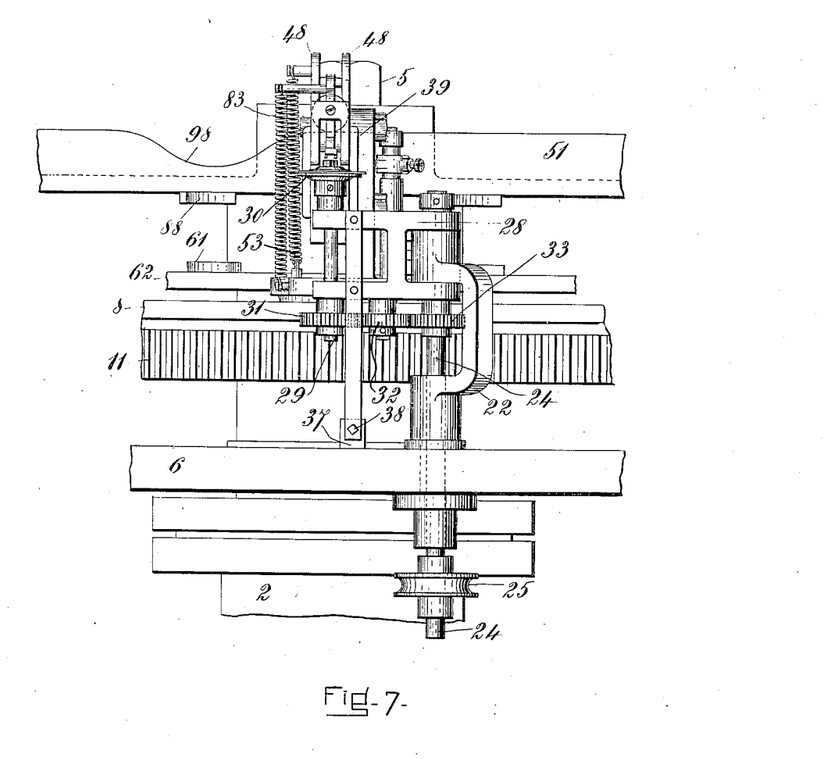
Fig. 7 is a front elevation of a nut carrier and saw, showing also the mounting for the saw and its driving mechanism, as well as adjacent parts of the framework.

On the ring 6 are mounted stationary brackets 22, equal in number to the slits which are to be cut in each nut and forming a circular series, except that a gap is preferably left at one point in this series, as at 23, Fig. 1. In each of the brackets 22 is journaled a spindle 24 extending upward past the rim of the table 8, in proximity thereto, and all of these spindles are simultaneously rotated in the same direction by providing the lower end of each of them with a belt pulley 25 and passing an endless belt 26 around the outside of the entire series of pulleys and thence under the central portion of the machine and over guide pulleys 27, as shown in Fig. 1, whence said belt is carried around an overhead driving pulley (not shown) which is rotated continuously. Each spindle 24 rotates a circular saw, which is so mounted as to be capable of moving toward and from the table 8. The arrangement of these saws is best illustrated in Figs. 3, 5 and 7, in which 28 represents a frame mounted at one end to swing horizontally on the upper portion of the spindle 24 carried by the corresponding bracket 22 and having journaled in it near its free end a spindle 29, to the upper end of which a saw 30 is secured. On the lower end of the spindle 29 is secured a pinion 31 meshing with an intermediate pinion 32 which is journaled on the frame 28 and meshes in turn with a third pinion 33 secured to the spindle 24, the result of this arrangement being that the frame 28 may swing on the spindle 24 without interfering with the continuous rotation of the saw which it carries. A spring 34 extends from an arm 35 carried by the frame 28 to a bracket 36 bolted to the ring 6 and serves to draw the corresponding saw toward the table 8, while permitting said saw to move away from the table to a limited extent as it follows the contour of the nut during its operation thereon, as hereinafter described. The inward movements of the saw are limited by a suitable stop 37, Fig. 5, which is engaged by a longitudinally-adjustable bolt 38 carried by the lower end of the arm 35.

To the table 8 are secured a number of nut carriers which, for reasons which will hereinafter appear, are preferably located at equal distances apart and form a series extending entirely around the table, although this is not essential. Each of these nut carriers comprises nut-holding jaws which are capable of closing and opening to grasp and discharge a nut, together with means for giving successive partial rotations to a nut carried thereby. As preferably constructed our nut carrier comprises an upright bracket 39 bolted to the top of the table 8 near its outer edge, which bracket carries two laterally-extending studs 40 and 41 located one above the other. On the studs 40 are mounted two arms 42, which are capable of rocking thereon, and each of these arms is provided at its outer end with a downwardly-extending jaw 43 having a slanting rear face, said jaws being separated laterally by a distance somewhat less than the length of a nut. In like manner, two arms 44 are mounted to rock on the lower stud 41, each of these arms being located in alinement with one of the arms 42 and provided at its outer end with an upwardly-extending jaw 45 located opposite the corresponding jaw 43 and also having a slanting rear face. The movements of these jaws are equalized by means such as extensions 46 and 47 formed on the arms 42 and 44 respectively and provided with mutually-engaging ends, as best shown in Fig. 5, whereby any rocking movement of either arm is necessarily accompanied by an equal rocking movement of the other arm in the opposite direction.

Figure 4:
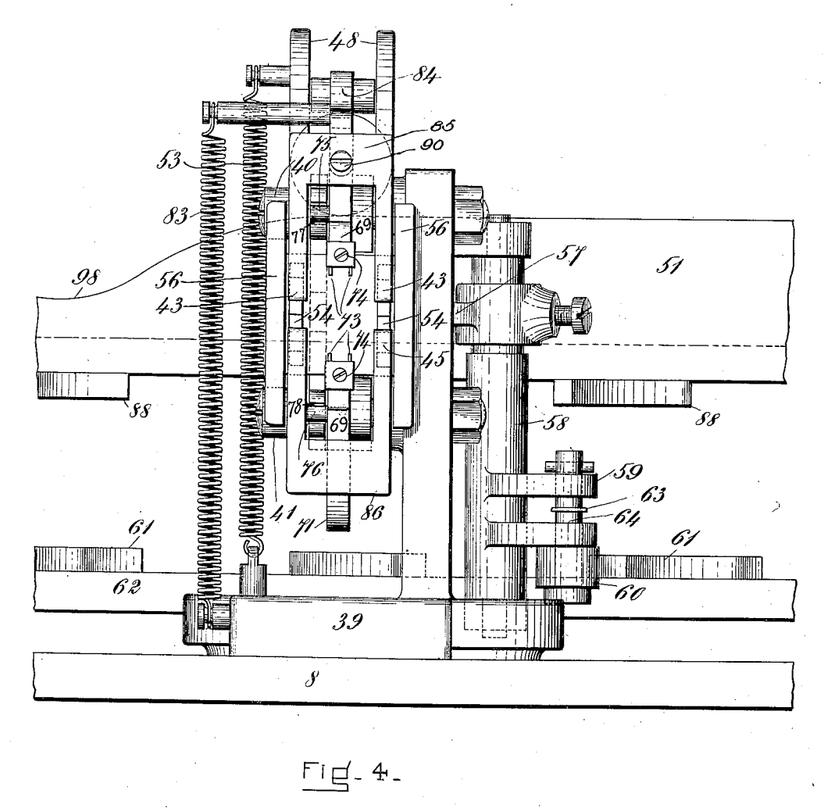
Fig. 4 is a front elevation of one of the nut carriers and adjacent parts.

The jaws above described form a portion of the devices for receiving and holding a nut, and for opening and closing these jaws one pair of arms, as for example the arms 42, are provided with rearwardly extending portions 48 having at their free ends a connecting portion 49 carrying a roller 50, which roller travels on an annular cam track 51 extending around the machine and preferably consisting of an upwardly-extending flange formed at the outer edge of a disk 52 carried by and rigidly connected to the upper end of the head 3. The roller 50 is held down upon the cam track 51 and caused to follow the same as the table 8 rotates by means of a spring 53 secured at one end to one of the portions 48 and at its other end to the base of the bracket 39, which spring therefore serves to open the jaws 43 and 45 whenever such movement is permitted by the cam 51, the arrangement being such that said jaws are normally held far enough apart to permit the passage of the edge of a saw between them as hereinafter described. These jaws 43 and 45 form collectively what will hereinafter be termed the front jaws, and in connection with them we employ a rear jaw consisting of two plates 54 located side by side, in alinement with the corresponding front jaws, and each having a V-shaped notch formed in its front end, as shown in Fig. 5, said plates being carried by and preferably formed integral with the outer end of a bar 55 mounted to slide longitudinally between the studs 40 and 41. Lateral movements of the rear jaw are prevented by means of vertical strips 56 secured thereto, the free ends of which embrace the arms 42 and 44, as shown in Fig. 4, and longitudinal movements as hereinafter described are given to the said jaw by means of an arm 57 having a pivotal connection with the rear end of the jaw and carried by a vertical rock shaft 58 journaled on the bracket 39 and provided with laterally-extending lugs 59 carrying a roller 60. This roller is moved in one direction by each one of a series of cams 61 secured to the periphery of a disk 62 which is supported by and rigidly attached to the head 3, and for moving said roller in the opposite direction and holding it in contact with said cams successively there is provided a spring 63 secured at one end to the pin 64 on which the roller turns and at its other end to a pin 65 carried by said disk 62, the arrangement of these parts being such that the spring 63 will throw the rear jaw forward whenever such movement is permitted by the cams 61.

Figure 6:
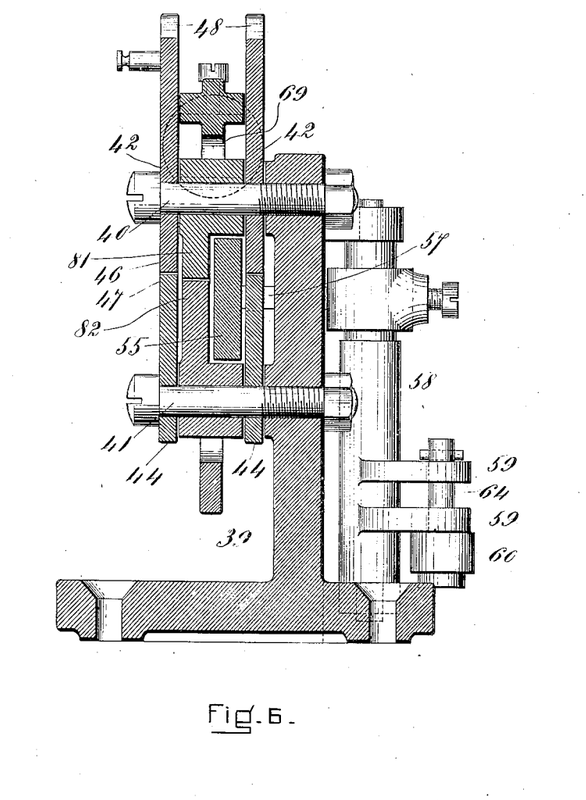
Fig. 6 is a vertical section taken on the line *x—x* in Fig. 5.

The bracket 39 is provided with a rearwardly-extending portion 66 carrying a horizontal pivot 67 on which is mounted a link 68. To the upper end of this link is pivoted an arm 69 which extends forward above the stud 40 and between the arms 42, and is provided near its front end with a downwardly-extending portion, the lower end of which is located between and in proximity to the jaws 43 and carries a number of downwardly-projecting teeth 70 arranged in horizontal series. There is also pivoted to the link 68, below the pivot on which it turns, an arm 71 which extends forward beneath the stud 41 and is so shaped that its front end extends upward between the arms 44, where it is provided with a number of upwardly-projecting teeth 72 arranged in horizontal series like the teeth 70 and similarly located with reference to the adjacent jaws. The teeth 70 and 72 point in opposite directions, the teeth 70 pointing forward or outward in the arrangement illustrated, and there are preferably two slightly-separated rows of teeth on each of the arms 69 and 71, said teeth being shown as formed on plates 73 clamped to the opposite sides of said arms by means of clips 74 embracing their ends and attached to the front and rear edges of the arms by means of set screws, as shown in Figs. 4 and 5. Said arms 69 and 71 are supported at their rear ends by the pivots which connect them to the link 68, and near their front ends they are provided respectively with laterally-extending pins 75 and 76 (see Fig. 4) adapted to slide in horizontal notches 77 and 78 formed in the front ends of arm 79 and 80, which arms are mounted to rock on the studs 40 and 41 between the arms 42 and 44 respectively. Said arms 79 and 80 are provided respectively with extensions 81 and 82, which are recessed to receive and provide for the movements of the rear jaw 54, as shown in Fig. 6, and have mutually-engaging ends as shown in dotted lines in Fig. 5, the construction being the same as that of the corresponding portions of the arms which carry the front jaws. The arms 79 and 80 thus provide an equalizing device whereby any vertical movement of either of the series of teeth 70 and 72 is necessarily accompanied by an equal movement of the other series in the opposite direction. The pins 75 and 76 also serve to support the front ends of the arms 69 and 71, and the teeth 70 and 72 which they carry are given a tendency to approach each other by means of a spring 83 connecting the upper arm 69 and the base of the bracket 39, the movement of said arms under the influence of this spring being limited by means of a forwardly-projecting portion 84 carried by the arm 69 in position to engage a cross piece 85 connecting the front ends of the arms 42. The front ends of the arms 44 are preferably connected by a similar cross pieece 86 for the sake of greater rigidity.

It will be evident that any rocking movement imparted to the link 68 will result in simultaneously moving the teeth 70 and 72 longitudinally in opposite directions, and for operating said link to produce this result the arm 71 is provided at its rear end with a bearing 87 adapted to engage successively each one of a series of cams 88 bolted to the under side of the rim of the disk 52. The bearing 87 is held against or drawn toward these cams by means of a spring 89 connecting the lower end of the link 68 and the pin 65, Fig. 2, which spring is normally under tension. As will hereinafted appear, it is desirable to adjustably limit the longitudinal movement of the teeth 70 and 72 under the influence of the spring 89, and to this end we provide a stop-screw 90 which passes through the cross-piece 85 in position to engage the vertical front face of the arm 69, by which engagement its forward movements will be limited in an obvious manner.

The saws are all located in the same plane, adjacent to the path of the nut carriers and in position to pass between the slightly-separated front jaws thereof, and in connection with each saw we provide a stop which serves to limit the depth of the slits cut thereby. This stop is preferably made adjustable, so that the depth of said slits may be varied to correspond with nut shells of different thicknesses, and it also serves as a bearing which, by engaging the shell of each nut adjacent to the point where it is being operated upon by the saw, causes the saw to follow the contour of the nut from one end to the other. Our preferred construction of these parts is illustrated in Fig. 5, in which 91 represents a vertical sleeve rigidly mounted in the free end of the frame 28, the saw spindle 29 being journaled in this sleeve. A collar 92 having a broad upper face is shrunk upon or otherwise secured to said spindle near its upper end and serves as a support for the saw 30, which is detachably clamped to said collar by means of a disk 93 and a nut 94. Said collar 92 rests upon the upper end of the sleeve 91 and thereby supports the saw and its spindle, and on the upper end of said sleeve is secured a collar 95 provided at its upper end with a circular disk 96 extending nearly to the outer edge of the saw and located immediately beneath the same. The perforation in said disk 96 and collar 95 is slightly eccentric to the periphery of the disk, so that by turning said parts on the sleeve 91 the edge of the disk may be caused to move slightly toward or away from the edge of the saw where it engages the nuts, the disk being held in the desired position of adjustment by means of a set screw 97. The edge of this disk which is adjacent to the nut carriers thus forms a stop directly beneath the operative portion of the saw, and by bearing upon the shell of a nut it causes the frame 28 and the saw which it carries to move away from the nut carrier according to the contour of the nut being operated upon, as above stated.

As thus constructed the operation is as follows: The table 8 is rotated in the direction indicated by the arrow in Fig. 1, which is also the direction of rotation of the saws 30, and as soon as each nut carrier reaches the gap 23 in the series of saws a depression 98, Fig. 7, formed in the cam track 51 permits the spring 53 to draw the rear end of the arms 42 downward and thus open the front jaws of the nut carrier. During the opening movement of these jaws the cross piece 85 engages the projection 84 on the arm 69, so that as said opening movement continues the front ends of the arms 69 and 71 are also separated, the spring 53 being made strong enough to overpower the spring 83 which tends to draw said arms 69 and 71 together. The rear jaw 54 is then drawn back by means of one of the cams 61, so that the nut-holding devices are now open to their maximum extent and in position to receive a nut. Assuming that a nut 99 is placed between the jaws while in this position, with the longitudinal axis of the nut pointing in the direction in which it moves, the further rotation of the table 8 causes the roller 50 on the nut carrier under consideration to move upward onto the high part of the cam track 51, whereby the front jaws are brought into the position shown in Fig. 5, where they remain throughout the remainder of the rotation of the table, or until the gap 23 is again reached by said roller, and serve as stops to define the position of the nut with respect to the series of saws. As the front jaws close the series of teeth 70 and 72 approach each other under the influence of the spring 83 until they engage the nut which is located between them, and thereafter the rear jaw 54 is thrown forward by the spring 63, thereby forcing the nut against the inclined rear faces of the front jaws and holding it firmly in this position, as represented in Fig. 5. The parts of the nut carrier remain in this position while the nut is carried past the first saw 30 of the series, which saw is thereby caused to cut a longitudinal slit 100 in the shell of the nut extending nearly from one end of the nut to the other, the location of the ends of the slit being determined by the adjustment of the stop bolt 38. While this slit is being cut the bearing 87 is moved forward by one of the cams 88, thereby causing the teeth 70 and 72 to assume the relative longitudinal position shown in Fig. 5. As soon as the nut carrier and nut have moved past the first saw, the rear jaw is drawn backward by one of the cams 61, and thereupon said cam 88 permits the spring 89 to draw the lower end of the link 68 to the left, as represented in Fig. 5, thereby moving the teeth 70 and 72 in the directions in which they point respectively until the arm 69 engages the stop screw 90. This movement of said teeth results in giving a partial axial rotation to the nut, the angle through which it turns being determined by the adjustment of said stop screw 90 and by the size of the nut, and as soon as this partial rotation has been effected the rear jaw 54 is again thrown forward by the spring 63 and thus holds the nut firmly while the next slit is being sawed in it by the succeeding saw, the arms 69 and 71 being simultaneously moved back into their former position by the action of the next cam 88, in readiness for a further operation of the teeth which they carry.

The operations above described are repeated until the nut has been carried past the entire series of saws, and the nut rotating devices are so adjusted that during the rotation of the table 8 an average nut of the size being operated upon will have been given practically a complete rotation on its longitudinal axis. As soon as the nut carrier reaches the end of the series of saws, where the depression 98 in the cam track 51 occurs, the nut-holding devices are again opened as previously described and the nut is ejected by a forward movement of the rear jaw 54, which jaw is immediately drawn back again before the next nut is inserted. Each nut carrier receives a nut at the gap 23 and discharges it after completing substantially one revolution, so that the machine is capable of operating simultaneously upon as many nuts as there are nut carriers, but if any carrier should occasionally fail to receive a nut the operation of the other carriers would be in no wise interfered with, as all the carriers operate wholly independently of one another, and the machine would be perfectly operative if but one nut carrier were employed.

It will be evident that with the arrangement above described a nut may be provided with as many longitudinal slits as may be desired, and hence it is possible to provide a nut with a large number of closely-adjacent slits, as a result of which the removal of the shell is greatly facilitated. The length of the slits can be varied by suitably adjusting the stop bolt 38, as above described, and the depth of cut can be minutely regulated by turning the disk 96 on its axis, so that the apparatus can be readily adjusted to operate upon nuts of any size, shape or thickness of shell. The plates 73 and saws 30 can easily be removed and replaced at any time, in case their teeth break or need sharpening.

The apparatus above described includes all the parts which are necessary for treating the nut in the desired manner, assuming that the nuts are fed to the nut carriers by hand, but for reasons which will hereinafter appear we prefer to provide in connection therewith a nut-feeding device which serves to introduce the nuts automatically into the successive nut carriers. Our preferred construction of nut feeder is shown in detail in Figs. 2 and 8, in which 101 represents a supplementary framework rigidly bolted to the ring 6 at a short distance back of the first saw 30, with reference to the direction in which the table 8 rotates. This framework 101 carries at its upper end a vertical stud 102 on which is journaled a table 103 and attached gear 104, said gear and table being continuously rotated in a direction opposite to that in which the table 8 rotates by means of a countershaft 105 journaled in the framework 101 and provided with gears 106 and 107, of which the former meshes with the gear 104 and the latter with a gear 108 secured to the main driving shaft 17, one of the bearings 18 for said shaft 17 being preferably carried by said framework.

Figure 8:
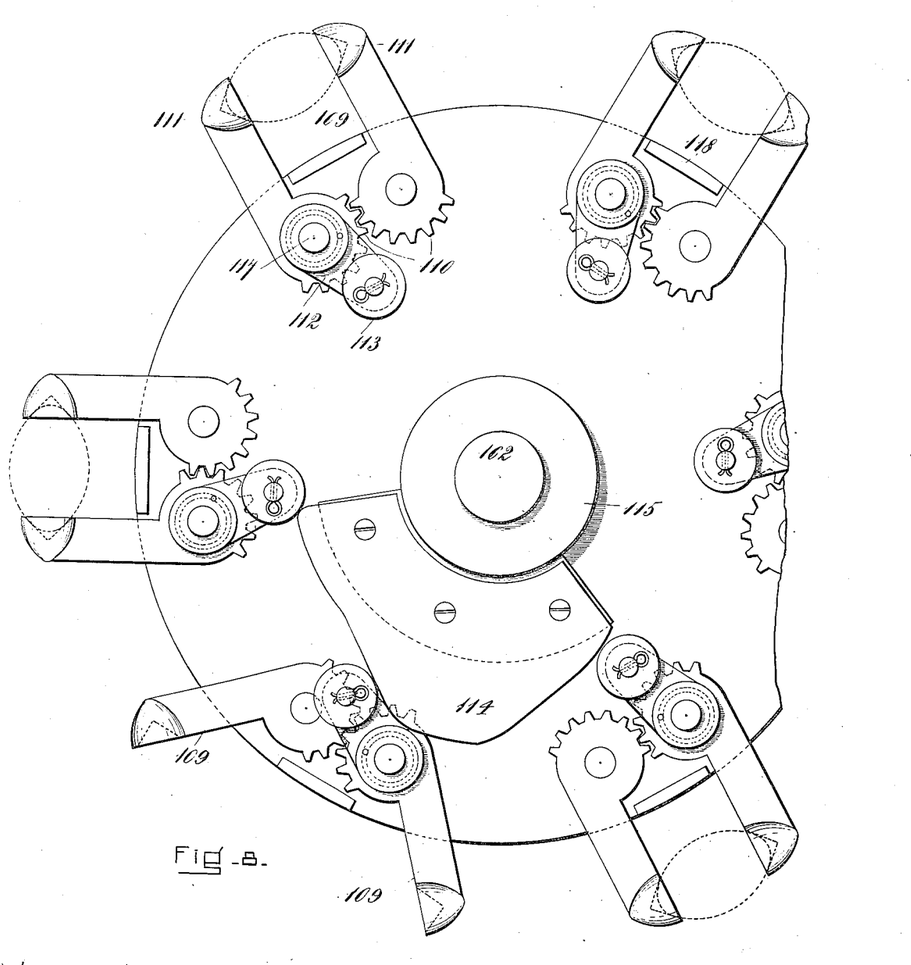
Fig. 8 is a plan view of the nut feeder on an enlarged scale.
Figure 9:
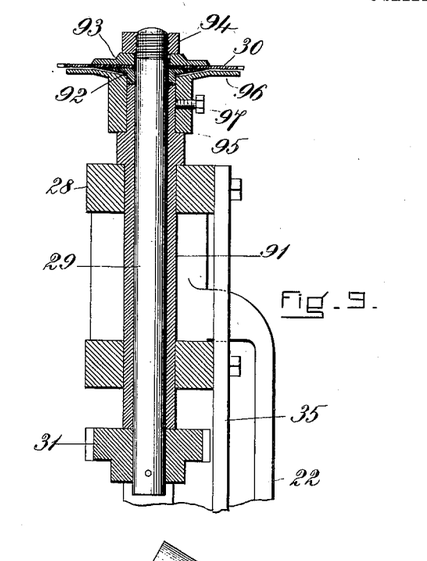
Fig. 9 is a central, vertical section through one of the saws and its mounting.
Figure 10:
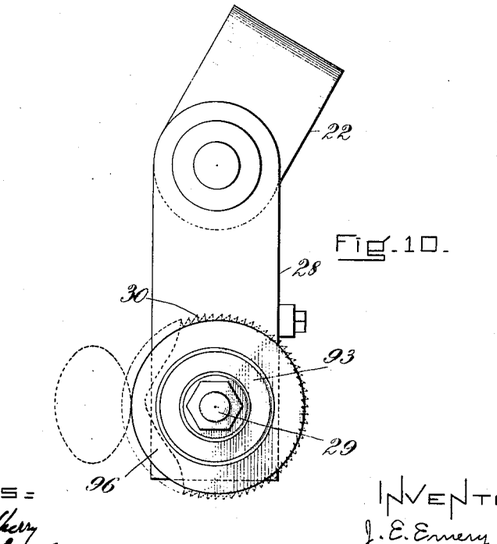
Fig. 10 is a plan view of the same, showing a portion of the saw in dotted lines and also showing an adjustable gage hereinafter described.

The table 103 carries near its periphery a number of pairs of jaws 109, which form a series extending entirely around the table, the spacing of these pairs of jaws being the same as the spacing of the nut carriers on the table 8. These jaws are pivoted at their inner ends to swing horizontally, and the jaws of each pair are preferably provided with means for causing them to move simultaneously through equal angles in opposite directions, such as intermeshing teeth 110 formed thereon and having the pivots on which said jaws swing as centers. The free ends of each pair of jaws are provided with opposed nut-holding devices 111, preferably cup-shaped in form, and to one of the jaws is rigidly secured an arm 112 carrying a roller 113, each roller being adapted to engage, as the table 103 rotates, a cam plate 114 carried by a collar 115 which is rigidly secured to the upper end of the stud 102. A tendency to close is given to each pair of jaws by suitable means such as springs 116 each mounted on an upwardly-extending portion 117 of one of the pivots on which the corresponding jaws swing.

The location of the jaws 109 is such that as each nut carrier reaches the point where it is closest to the table 103, at which point its nut-receiving devices are wide open as previously explained, the cup-shaped extremities of a pair of jaws 109 will pass between said nut-receiving devices, and the location and contour of the cam plate 114 is such that as soon as this position has been reached said jaws are caused to open, and are held open during a portion of the rotation of the table 103. While they are so held open an attendant places one end of a nut in one of the cup-shaped recesses formed on one of the jaws and holds it there while the table 103 rotates, until the corresponding roller 113 reaches a portion of the cam 114 which permits said jaws to close under the influence of the spring 116, whereupon the nut is grasped by its ends between the free ends of the jaws. It then moves with the table 103 until it is brought between the open jaws of one of the nut carriers at the point where the paths of said jaws and of the jaws 109 intersect, is then grasped by the nut carrier as previously described, and is immediately released by the jaws 109 by the opening of the latter as above set forth. The nut is then carried past the series of saws and discharged at the gap 23, and the nut carrier from which it has just been discharged immediately receives another nut from the feeder. The closing movements of the jaws 109 are limited when the machine is in operation by the presence of the nuts carried thereby and at other times by stop pieces 118 each carried by the table 103 located between a pair of jaws. Any pair of jaws may evidently be opened by hand to receive or release a nut at any point of the path in which the jaws travel, if desired.

It will be apparent from the above description that during the operation of the machine each nut carrier in turn receives a nut from one of the pairs of jaws 109 so long as nuts are supplied to the successive pairs of said jaws carried by the feeder, and we have found in practice that nuts can be supplied to the feeder by an attendant much more rapidly and with greater certainty than they can be supplied directly to the successive nut carriers, so that by the employment of the nut feeder the speed and consequent capacity of the apparatus may be substantially increased.

We claim as our invention:

1. In a machine of the class described, the combination with shell-slitting devices of devices for holding a nut and presenting it to the operation of said slitting devices, and means for imparting successive partial rotations to the nut with respect to said nut-holding devices, between the successive slitting operations.

2. In a machine of the class described, the combination with a plurality of shell-slitting devices equal in number to the slits to be cut in each nut and arranged to operate in series, one after another, of means for holding a nut and for subjecting different portions of its shell to the operation of each of said slitting devices successively.

3. In a machine of the class described, the combination with a series of shell-slitting devices all operating in the same plane, of means for subjecting a nut to the operation of each of said slitting devices successively, and means for partially rotating the nut between the successive operations of consecutive devices.

4. In a machine of the class described, the combination with shell-slitting devices arranged to operate successively upon each of a series of nuts, one after another, of a series of nut carriers each provided with means for grasping a nut and for imparting successive partial rotations thereto between the successive slitting operations thereon.

5. In a machine of the class described, the combination with a series of shell-slitting devices of a series of nut carriers movable past said devices successively and arranged to present a corresponding number of nuts to the operation of each of said devices, and means for partially rotating each nut between the successive operations of the slitting devices thereon.

6. In a machine of the class described, the combination with a series of shell-slitting devices of a series of nut-carriers arranged to subject a number of nuts to the operation of a corresponding number of slitting devices simultaneousy and each nut to each slitting device successively, and means for partially rotating each nut between the successive operations of the slitting devices thereon.

7. In a machine of the class described, the combination of a series of saws and means for driving the same, a nut carrier adapted to present a nut to the operation of said saws, means for moving the carrier past the saws successively, and means for partially rotating the nut within the carrier between the successive operations of the saws on said nut.

8. In a machine of the class described, the combination of a circular series of saws and means for driving the same simultaneously, a concentric series of nut carriers each adapted to present a nut to the operation of the saws successively, means for moving the carriers past the saws, and means for partially rotating each nut between the successive operations of the saws thereon.

9. In a machine of the class described, the combination with a series of saws and means for driving the same, of a nut carrier having means for grasping a nut in such manner as to expose one side of the same from end to end to the operation of each saw, means for moving said nut carrier past the saws successively, and means for partially rotating the nut within the carrier between the successive operations of the saws on said nut.

10. In a machine of the class described, the combination with a circular series of saws and means for driving the same, of a concentric circular series of nut carriers each having means for grasping the sides of a nut, leaving a portion of the latter exposed from end to end, means for moving said series of carriers past the saws successively, lengthwise of the nuts, means for causing each saw to follow the contour of a nut while operating on the same, and means for partially rotating each nut between the successive operations of the saws thereon.

11. In a machine of the class described, a nut carrier comprising nut-holding jaws and means for actuating the same, said jaws being formed to expose one side of a nut to the action of a saw from one end of the nut to the other, and means for imparting successive partial rotations to the nut with respect to said jaws.

12. In a machine of the class described, a nut carrier comprising a pair of opposed front jaws provided with extremities which extend toward each other and have a space between them when in closed position, said jaws providing a nut-receiving recess behind said extremities, a rear jaw arranged to hold a nut against the front jaws, and means for opening and closing said jaws.

13. In a machine of the class described, a nut carrier comprising a pair of opposed front jaws provided with extremities which extend toward each other and have a space between them when in closed position, said jaws providing a nut-receiving recess behind said extremities and being connected to move equally in opposite directions, a rear jaw arranged to hold a nut against the front jaws, and means for opening and closing said jaws.

14. In a machine of the class described, a nut carrier comprising a pair of opposed front jaws and means for opening and closing the same, a rear jaw arranged to hold a nut against the front jaws, and means for throwing the rear jaw forward to eject a nut while the front jaws are open.

15. In a machine of the class described, a nut carrier comprising jaws arranged to grasp the sides of a nut and providing a space between their extremities when in closed position, and means for imparting successive partial rotations to the nut between and with respect to said jaws.

16. In a machine of the class described, a nut carrier comprising jaws arranged to grasp the sides of a nut and providing a space between their extremities when in closed position, and means for imparting successive partial rotations to the nut between and with respect to said jaws, comprising opposed arms adapted to engage the opposite sides of the nut and means for imparting a relative longitudinal movement to said arms.

17. In a machine of the class described, a nut carrier comprising a pair of opposed front jaws having a space between their extremities when in closed position, a rear jaw arranged to hold a nut against the front jaws, means for actuating said jaws, to grasp and release a nut, and means for imparting successive partial rotations to a nut held therein.

18. In a machine of the class described, a nut carrier comprising a pair of opposed front jaws and a rear jaw coöperating therewith, means for actuating said jaws, to grasp and release a nut, nut-rotating devices comprising arms adapted to engage the opposite sides of a nut within the jaws, and means for actuating said nut-rotating devices.

19. In a machine of the class described, a nut carrier comprising nut-holding jaws, means for actuating the same, to grasp and release a nut, opposed arms adapted to engage the opposite sides of a nut, and means for imparting a longitudinal movement to said arms relatively to each other.

20. In a machine of the class described, a nut carrier comprising nut-holding jaws, arms adapted to engage the opposite sides of a nut within the jaws, and movable independently of the latter, springs arranged to operate said jaws and arms in one direction, and means for operating said jaws and arms in opposition to said springs.

21. In a machine of the class described, a bodily-movable nut carrier comprising nut holding jaws and devices for partially rotating a nut between and with respect to said jaws, and means operated by the movement of the nut carrier for actuating said rotating devices.

22. In a machine of the class described, a nut carrier having a pair of opposed front jaws and a rear jaw coöperating therewith, nut-rotating devices comprising opposed arms adapted to grasp the opposite sides of a nut between the jaws, said arms being mounted to approach and recede from each other as the front jaws close and open, means for actuating said arms to partially rotate a nut, and means for opening and closing said jaws.

23. In a machine of the class described, a nut carrier having a pair of opposed front jaws connected to move equally in opposite directions and having a space between their extremities when in closed position, a rear jaw coöperating therewith, means for opening and closing said jaws, a pair of arms movable longitudinally and provided between the upper and lower front jaws respectively with opposed teeth, the toothed portions of said arms being connected to approach and recede from each other as the front jaws close and open, and means for simultaneously moving said arms longitudinally in opposite directions.

24. In a machine of the class described, the combination of a bracket, rocking arms mounted thereon one above the other and having opposed double front jaws, means for opening and closing said jaws, a bar mounted to slide longitudinally between said rocking arms and carrying a rear jaw at its outer end, means for moving said rear jaw toward and from the front jaws, a link pivoted to said bracket, upper and lower arms each pivoted to said link on opposite sides of its axis and having opposed teeth located between the upper and lower jaws respectively, means for supporting the toothed ends of said arms, means for causing equal and opposite simultaneous movements of said front jaws and opposed teeth, and means for rocking said link while the rear jaw is drawn away from the front jaws.

25. In a machine of the class described, a nut carrier comprising a bracket, rocking arms carried thereby and connected to move equally in opposite directions, said arms being provided with opposed front jaws extending toward each other and leaving a space between them when in the closed position, a spring tending to open said front jaws, means for closing the same in opposition to said spring, a rear jaw mounted to slide toward and from said front jaws, a spring constantly tending to move it toward the latter, means for drawing said rear jaw away from the front jaws in opposition to its spring, a link pivoted to said bracket and a spring tending to rock the same in one direction, a pair of arms pivoted at their rear ends to said link and having their front ends located between and adjacent to said front jaws respectively and provided with opposed teeth, means for supporting the front ends of the latter arms and for causing equal movements thereof in opposite direction when the front jaws open and close, and means for rocking said link in opposition to its spring.

26. In a machine of the class described, a nut carrier comprising a bracket, rocking arms carried thereby and connected to move equally in opposite directions, said arms being provided with opposed front jaws extending toward each other and leaving a space between them when in the closed position, a spring tending to open said front jaws, means for closing the same in opposition to said spring, a rear jaw mounted to slide toward and from said front jaws, a spring constantly tending to move it toward the latter, means for drawing said rear jaw away from the front jaws in opposition to its spring, a link pivoted to said bracket and a spring tending to rock the same in one direction, a pair of arms pivoted at their rear ends to said link and having their front ends located between and adjacent to said front jaws respectively and provided with opposed teeth, means for supporting the front ends of the latter arms and for causing equal movement thereof in opposite directions when the front jaws open and close, means for rocking said link in opposition to its spring, and an adjustable stop arranged to limit the movement of said toothed arms under the influence of the last-mentioned spring.

27. In a machine of the class described, the combination with a rotatable table of a nut carrier having nut-holding jaws and devices for rotating a nut between and with respect to said jaws, springs tending to operate said jaws and rotating devices in one direction, and fixed cams arranged to operate said jaws and rotating devices in opposition to said springs as the table rotates.

28. In a machine of the class described, the combination with a rotatable table of a concentric series of nut carriers each having nut-holding jaws and devices for rotating a nut between and with respect to said jaws, springs tending to operate said jaws and rotating devices in one direction, and fixed cams arranged to operate said jaws and rotating devices in opposition to said springs as the table rotates.

29. In a machine of the class described, the combination with a series of saws and means for driving the same, of a nut carrier movable past said saws successively and arranged to present a nut thereto, means for partially rotating the nut between the successive operations of the saws thereon, and means for ejecting the nut after it has passed all the saws.

30. In a machine of the class described, the combination of a central standard, a circular series of saws carried thereby and means for rotating the same, means tending to move each saw toward the center of the series, a table journaled on the standard, means for rotating the table, a nut carrier mounted on said table and provided with jaws adapted to grasp the sides of a nut, said jaws being formed to permit the passage of each saw between them in contact with a nut from one end to the other, means for partially rotating each nut between the successive operations of the saws thereon, springs for actuating said jaws and rotating devices in one direction, and cams carried by said standard and arranged to operate said jaws and nut-rotating devices in opposition to said springs as the table rotates.

31. In a machine of the class described, the combination with a series of saws and means for rotating the same, of a series of nut carriers and means for moving the same past said saws, each nut carrier having means for presenting a nut to the operation of the saws successively, and a nut feeder arranged to transfer nuts to said nut carrier.

32. In a machine of the class described, the combination with a nut carrier having nut-receiving jaws and means for opening and closing the same, of a nut feeder comprising a table and means for rotating the same, jaws mounted on said table in position to carry a nut between the jaws of the nut carrier, means for opening the jaws of the nut feeder while located between the jaws of the nut carrier, and means for closing the jaws of the nut feeder after the latter have moved away from the nut carrier and received a nut.

33. In a machine of the class described, in combination, a nut feeder comprising a table and means for rotating the same, a plurality of pairs of jaws carried by said table and having cup-shaped extremities adapted to grasp the ends of a nut, leaving the sides of the latter exposed, springs tending to close the jaws of each pair, and means operated by the rotation of the table for opening said jaws successively.

34. In a machine of the character described, in combination, a nut feeder comprising a table and means for rotating the same, a plurality of pairs of jaws carried by said table and having cup-shaped extremities adapted to grasp the ends of a nut, leaving the sides of the latter exposed, springs tending to close the jaws of each pair, a bearing carried by one of the jaws of each pair, and a fixed cam plate along which said bearings travel as the table rotates, whereby the jaws of each pair are opened successively.

35. In a machine of the class described, the combination with a circular series of saws and means for driving the same continuously, of a table mounted to rotate concentrically with said series of saws and means for rotating the same, a series of nut carriers secured to said table and spaced at equal distances apart, each of said carriers comprising means for grasping a nut and presenting it to the operation of the successive saws and means for partially rotating the nut between successive operations thereon, and a nut feeder comprising a rotatable table having a series of pairs of nut holding jaws mounted thereon, the spacing of said pairs of jaws being the same as the spacing of the nut carriers and the path of the jaws of the nut feeder intersecting the path of the nuts held by the nut carriers, and means for opening each pair of jaws of the nut feeder while located in position to deliver a nut to one of the nut carriers.

In testimony whereof, we have hereunto subscribed our names this eighth day of August, 1905.

JOHN E. EMERY.
DAVID E. HUNTER.

Witnesses:
OWEN MITCHELL,
E. D. CHADWICK.